(12) United States Patent
Gossner et al.

(10) Patent No.: US 8,390,970 B2
(45) Date of Patent: Mar. 5, 2013

(54) METHOD AND SYSTEM FOR ELECTROSTATIC DISCHARGE PROTECTION

(75) Inventors: Harald Gossner, Riemerling (DE);
David Johnsson, Munich (DE);
Wolfgang Soldner, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 342 days.

(21) Appl. No.: 12/912,781

(22) Filed: Oct. 27, 2010

(65) Prior Publication Data

US 2012/0106010 A1 May 3, 2012

(51) Int. Cl.
*H02H 9/00* (2006.01)
(52) U.S. Cl. ............................... 361/57; 361/58
(58) Field of Classification Search ............... 361/56, 361/57
See application file for complete search history.

(56) References Cited

U.S. PATENT DOCUMENTS

| | | | |
|---|---|---|---|
| 6,181,754 B1* | 1/2001 | Chen | 375/350 |
| 6,504,885 B1* | 1/2003 | Chen | 375/350 |
| 2003/0179523 A1* | 9/2003 | Kodama | 361/56 |
| 2004/0057172 A1* | 3/2004 | Sun | 361/56 |
| 2009/0319251 A1* | 12/2009 | Ito et al. | 703/14 |
| 2011/0016440 A1* | 1/2011 | Bergmann et al. | 716/106 |

OTHER PUBLICATIONS

"A transient field measurement system to analyze the severity and occurance rate of electrostatic discharge", Frei et al, Technical University Berline, Nov. 1997.*
"The State of the Art of Electrostatic Discharge Protection: Physics, Technology, Circuits, Design, Simulation, and Scaling", Voldman, IEEE Journal of Solid-State Circuits, vol. 34, No. 9, Sep. 2009.*
"ESD Protection for Mixed-Signal Circuits—Design or Test Problem?" Lubana et al, University of Waterloo, 2008.*
Steve Marum et al., Protecting Circuits from the Transient Voltage Suppressors Residual Pulse duringIEC 61000-4-2 Stress, EOS/ESD Symposium 2009, pp. 377-385.
System Level ESD Part I: Common Misconceptions and Recommended Basic Approaches, White Paper 3 Part I: Eliminating Misconceptions in the Design of ESD Robust System, Industry Council on EDS Target Levels, Sep. 2010.
Harald Gossner, ESD Robust Systems—Contribution by IC Design, IEW 2009 (International Energy Workshop) in Lake Tahoe.

* cited by examiner

*Primary Examiner* — Michael D Masinick
(74) *Attorney, Agent, or Firm* — Infineon Techn AG Patent Department

(57) ABSTRACT

A method and a system for ESD protection are provided. In one embodiment, the system comprises a circuit comprising at least one non-linear element, an application module configured to apply a set of current pulses to the circuit, a determination module configured to determine at least one frequency-dependent and amplitude-dependent transfer function of the circuit based on the set of applied current pulses, a modeling module configured to model at least one frequency-dependent and current-dependent impedance of the at least one non-linear element, and a simulation module to simulate a transmission to the circuit based on the model.

28 Claims, 4 Drawing Sheets

METHOD AND SYSTEM FOR ELECTROSTATIC DISCHARGE PROTECTION

TECHNICAL FIELD

The present invention relates generally to electrostatic discharge (ESD) protection. In particular, the present disclosure relates to a method and system for providing an ESD circuit protection.

BACKGROUND

In an ESD system, integrated circuit chips may comprise connection elements that are exposed to external connections. For example, critical pins that are attached to signal bus connecting several PCBs or pins that are attached to external connectors, such as USB pins. These connection elements are equipped with additional active and passive protection elements on board to withstand high system stress pulses. The on-chip circuit of these connection elements and the on-board protection circuitry has to match regarding turn-on and clamping behavior. For example, the on-board diodes for protection have to shunt most of the current and limit voltage drop across the on-chip circuit of external connection elements. In some cases, the passive protection elements, such as resistors, may have to be placed to provide such matching. A need exists for a system and method to provide an ESD protection circuit with necessary board components and IC requirements.

SUMMARY OF INVENTION

The present disclosure provides a method and a system for ESD protection. In one embodiment, the system comprises a circuit comprising at least one non-linear element, an application module configured to apply a set of current pulses to the circuit, a determination module configured to determine at least one frequency-dependent and amplitude-dependent transfer function of the circuit based on the set of applied current pulses, a modeling module configured to model at least one frequency-dependent and current-dependent impedance of the at least one non-linear element, and a simulation module to simulate a transmission to the circuit based on the model.

In an alternative embodiment, the present disclosure provides a method for ESD protection. The method comprises applying at least one current pulse to determine at least one frequency-dependent and amplitude-dependent transfer function of the circuit, modeling at least one frequency-dependent and current dependent impedance of the at least one non-linear element of the circuit based on the at least one frequency-dependent and amplitude-dependent transfer function, and simulating a transmission to the circuit based on the model.

In yet another alternative embodiment, the present disclosure provides a computer program product embodied in a tangible medium comprising computer implemented instructions for determining at least one frequency-dependent and amplitude-dependent transfer function of the circuit, modeling at least one frequency-dependent and current-dependent impedance of the at least one non-linear element of the circuit based on the at least one frequency-dependent and amplitude-dependent transfer function, simulating a transmission to the circuit based on the model, and comparing a voltage amplitude and a dissipated energy of at least one element of the circuit to at least one fail threshold of voltage and at least one fail threshold of energy.

DETAILED DESCRIPTION

Figure 1:
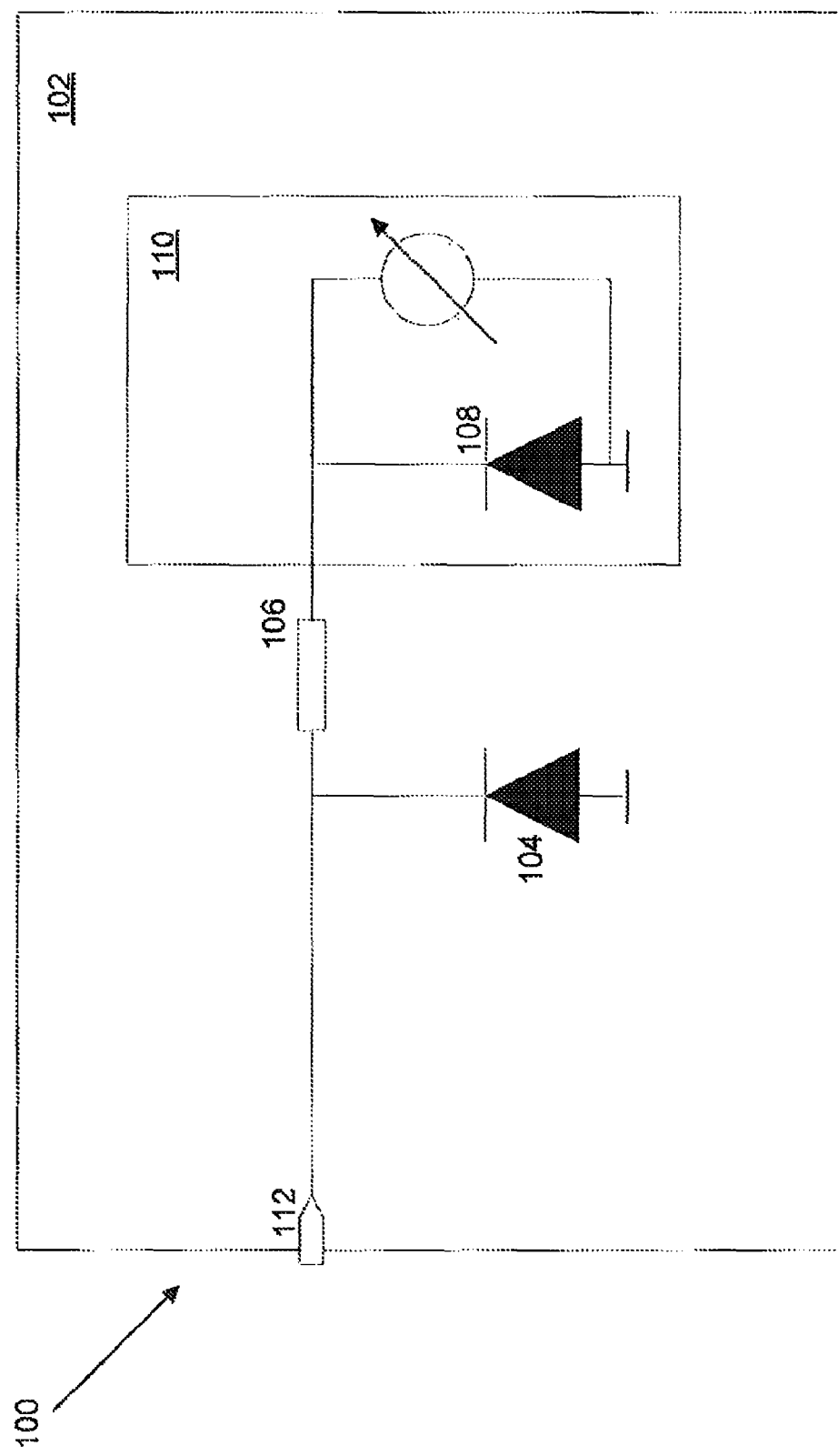
FIG. 1 is a diagram illustrating an ESD protection circuit in accordance with one embodiment of the present disclosure.

Referring to FIG. 1, a diagram illustrating an ESD protection circuit is depicted in accordance with one embodiment of the present disclosure. As shown in FIG. 1, ESD protection circuit 100 comprises a printed circuit board (PCB) 102 having PCB diode 104, linear element 106, and an input/output subcircuit 108 within an integrated circuit 110. Linear elements 106 may comprise inductance, resistance or capacitance. ESD protection circuit 100 may comprise at least one non-linear element. PCB diode 104 may comprise TVS diodes. Both IO subcircuit 108 and PCB diode 104 may be characterized by Dirac pulses or stepwise transmission line pulses of increasing current.

Figure 2:
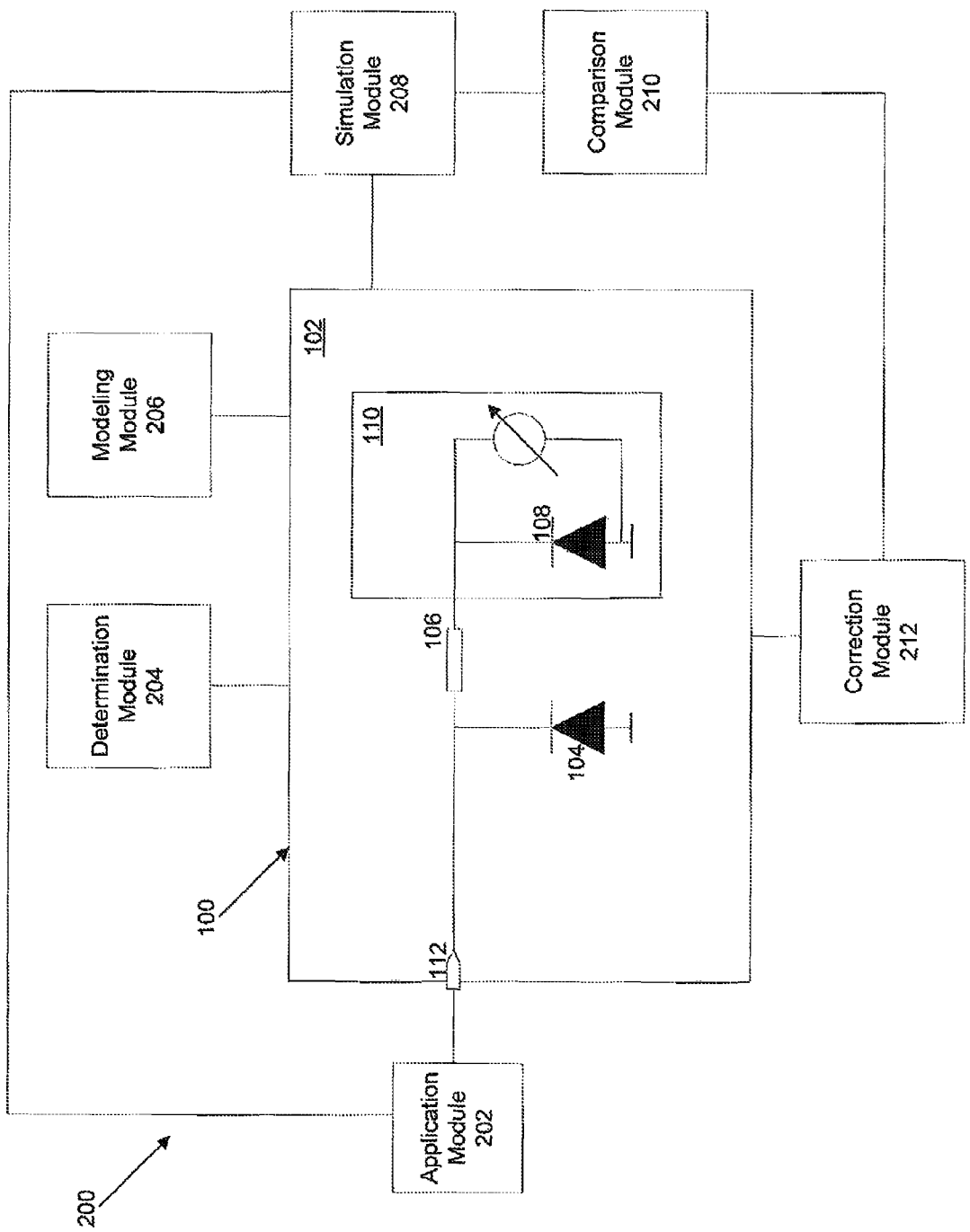
FIG. 2 is a diagram illustrating a system for ESD protection in accordance with one embodiment of the present disclosure.

Referring to FIG. 2, a diagram illustrating a system for ESD protection is depicted in accordance with one embodiment of the present disclosure. In this embodiment, system 200 comprises an application module 202 that is electrically coupled to input 112. Application module 202 provides a set of current pulses to ESD protection circuit 100. The set of current pulses may have a short rise time, for example, about 10 picoseconds, and a current level ranging from about 10 mA to about 10 A. However, the current pulses may also have different current levels and a predetermined pulse length.

To detect the turn on behavior of the PCB diodes 104 and IO subcircuit 108, the set of current pulses applied by application module 202 should have fast rise time, for example, less than 1 ns. In addition, the pulse length of the set of current pulses should be sufficient to allow the device to reach quasi-stationery state after turn-on. An example of a sufficient pulse length is greater than 20 ns. Another exemplary current pulse may be a 50 ohm transmission line pulse with a rise time of 100 ps and a variable pulse length from the nanosecond range to the microsecond range. To detect non-linearity of elements of ESD circuit 100, a similar pulse may be applied but with a higher source impedance, for example, a 1 kilo ohm transmission line pulse.

A determination module 204 is provided in system 200 to determine at least one frequency-dependent and amplitude-dependent transfer function of ESD circuit 100 based on the set of current pulses that are applied by the application module 202 at input 112. For example, a first frequency-dependent and amplitude-dependent transfer function may be determined by determination module 204 at PCB diodes 104. A second frequency-dependent transfer function may be determined by determination module 204 at linear element 106. A third frequency-dependent and amplitude-dependent transfer function may be determined by determination module 204 at IO subcircuit 108. The determination module 204 may be electrically coupled to PCB diode 104, linear elements 106, and IO subcircuit 108.

In one embodiment, the determination module 204 derives the at least one frequency-dependent and amplitude-dependent transfer function from the fourier transform of the time-dependent incident and a transmitted waveforms at each of the different current levels of the set of current pulses applied by the application module 202. A transmitted square pulse is represented in the frequency domain by a set of sine functions, such as $\sin(\omega t_p)/\omega$, wherein $t_p$ represents duration of the current pulse. The voltage amplitude varies with the type of device.

Once the at least one frequency-dependent and amplitude-dependent transfer function is determined, a modeling module 206 is provided in system 200 to model at least one frequency-dependent and current-dependent impedance of non-linear elements. The modeling module 206 splits the spectra of the inident waveform into a number of frequency bands. In one embodiment, the modeling module 206 then determines at least one frequency-dependent and current-dependent impedance from a look up table. The look up table may comprise a number of current level and frequency band dependent impedances determined from the at least one frequency-dependent and amplitude-dependant transfer function.

Alternatively, the modeling module 206 may derive an analytical function determined from the at least one frequency-dependent and amplitude-dependent transfer function. The modeling module 206 then calculates the at least one frequency-dependent and current-dependent impedance using the analytical function.

Once the at least one frequency-dependent and current-dependent impedance of non-linear elements are modeled, a simulation module 208 is provided to simulate a transmission to the ESD circuit 100 based on the model. To simulate the transmission, the simulation module 208 initiates the application module 202 to apply at least one current pulse with a plurality of increasing current levels, up to a maximum value, and at least one circuit parameters to ESD circuit 100 at input 112. The simulation module 208 then determines voltage amplitude and dissipated energy of at least one element of the circuit 100 at each of the increasing current levels.

A comparison module 210 is provided in system 200 to compare a voltage amplitude and dissipated energy of at least one element of the circuit to at least one fail threshold of voltage and at least one fail threshold of energy. In one embodiment, the voltage amplitude of at least one element of the circuit comprises a set of current dependent curves. The at least one fail threshold of voltage comprises a plurality of voltage amplitudes within a frequency range. The comparison module 210 is provided to compare an amplitude of each of the set of current dependent curves with a given voltage profile. The given voltage fail profile (in one embodiment) is a product of at least one fail threshold of voltage and a weighted power spectrum of one of the set of current pulses.

The at least one fail threshold of voltage amplitude is dependent on the stressed on-chip circuit, such as gate oxide, and the power spectrum of the considered stress pulses. One way to determine the at least one fail voltage amplitude is to normalize the voltage amplitude relative to the power spectrum of the stress pulse and compare to voltage amplitude of the circuit at issue.

The dissipated energy of at least one element of the circuit is determined based on an integration of a dissipated power over frequency of at least one element of the circuit. The integration of a dissipated power of at least one element of the circuit is determined based on an integration of a power spectrum of the at least one current pulse and a ratio of a transmitted current amplitude to an incident current amplitude.

For example, the integration of a dissipated power over frequency of at least one element of the circuit may be determined from the equation $P_{trans}(I_n) = \int P(\omega) \cdot |S21(\omega, I_n)|^2 d\omega < P_{max}$ (for any $I_n < I_{max}$), wherein $P(\omega)$ is the power spectrum of ESD pulse under consideration, S21 is the ratio of a transmitted current amplitude to an incident current amplitude, $I_n$ is the current level of the incident pulse, $P_{trans}$ the transmitted power, and $P_{max}$ is derived from a plurality of energy levels in a pulse duration regime or Wunsch-Bell function based on a time regime, such as half the pulse width.

In one embodiment, the at least one fail threshold of energy comprises a plurality of energy levels in a pulse duration regime in which at least one fail threshold of energy is dependent on the length of the applied current pulses. For example, in a short length pulses regime (<<10 ns) the at least one fail threshold of energy is linearly depending on pulse duration (adiabatic regime). In a medium pulse duration regime, such as a pulse length of about 10 ns to about 10 µs, a square root relationship occurs between the at least one fail threshold of energy and the pulse length due to thermal conduction during the pulse.

Alternatively, the at least one fail threshold of energy comprises a plurality of energy levels in a quasi stationary regime in which the at least one fail threshold of energy is independent of the length of the applied current pulses. In this regime, the at least one fail threshold of energy is independent of the pulse length due to balancing of locally dissipated power and thermal conduction during the pulse.

By simulating the transmission of the circuit and examining voltage and energy at various location of the circuit, a thorough evaluation of the circuit robustness over a wide spectrum may be performed without pre-assumptions about the transmitted waveform. Also, the simulation provides a realistic assessment of the transient behavior of the ESD circuit such that the design of the circuit may be optimized.

A correction module 212 is provided in system 200 to adjust at least one parameter of the circuit based on the comparing of the voltage amplitude and dissipated energy with the at least one fail threshold of voltage and at least one fail threshold of energy.

Figure 3:
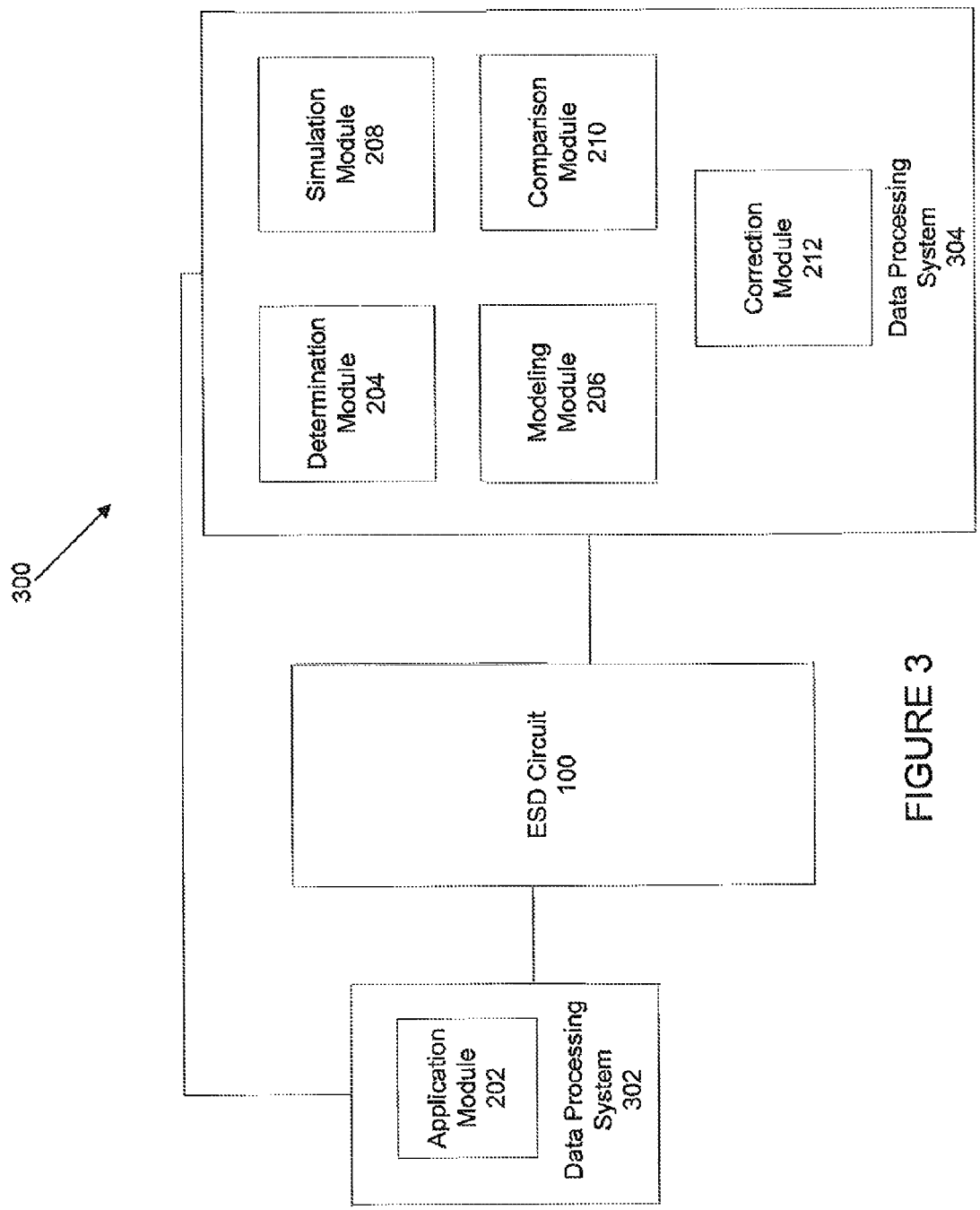
FIG. 3 is a diagram of one implementation of the system for ESD protection in accordance with one embodiment of the present disclosure.

Referring to FIG. 3, a diagram of one implementation of the system for ESD protection is depicted in accordance with one embodiment of the present disclosure. In this exemplary implementation, system 300 comprises data processing system 302, ESD circuit 100, and data processing system 304. Data processing system 302 is electrically coupled to the ESD circuit 100 and comprises an application module 202. Data processing system 302 may be any system capable of generating current pulses and receiving other data, for example, a pulse generator. The pulse generator may be a single-channel pulse generator or a multi-channel pulse generator such as a digital pulse generator.

System 300 also comprises data processing system 304 that is electrically coupled to ESD circuit 100. In this implementation, data processing system 304 comprises the determination module 204 and modeling module 206. The determination module 204 is configured to determine at least on frequency-dependent and amplitude-dependent transfer function of the circuit 100 based on a set of current pulses applied by application module 202. The modeling module 206 is configured to model at least one frequency-dependent and current-dependent impedance of at least one non-linear element of circuit 100.

Data processing system 304 further comprises simulation module 208, comparison module 210, and correction module 212. The simulation module 208 is configured to simulate a transmission to the circuit 100 based on a model from the modeling module 206. Comparison module 210 is configured to compare a voltage amplitude and dissipated energy as measured from at least one element of the circuit to at least one fail threshold of voltage and at least one fail threshold of energy. The correction module 212 is configured to adjust at least one parameter of the circuit 100 based on the comparison of the voltage amplitude and dissipated energy as measured and the at least one fail threshold of voltage and at least one fail threshold of energy.

Data processing system 304 may be any system capable of determining transfer functions and modeling behaviors of elements in circuit 100 such as a controller, a processor, a personal computer, a server or other types of system capable of performing calculations necessary to determine such functions and model such behaviors. In addition, determination module 204, modeling module 206, simulation module 208, comparison module 210, and correction module 212 may be implemented as computer-implemented instructions executable as a program by data processing system 304. The computer-implemented instructions may be embodied in tangible computer readable medium such as a hard disk, a floppy disk or a non-volatile memory.

It is noted that the system 300 as shown in FIG. 3 is for illustrative purpose only. System 300 may comprise additional or less number of data processing systems. In addition, the number of modules within each of the data processing systems may vary. Any one or any combination of determination module 204, modeling module 206, simulation module 208, comparison module 210, and correction module 212 may be implemented in a same or different data processing system. For example, the determination module 204, modeling module 206, and simulation module 208 may be implemented in one data processing system while comparison module 210 and correction module 212 may be implemented in another data processing system. Further, any one of the modules as illustrated in FIG. 3 may be combined with another module to perform a combined function. For example, the simulation and modeling functions may be performed by combining the simulation module 208 and modeling module 206.

Figure 4:
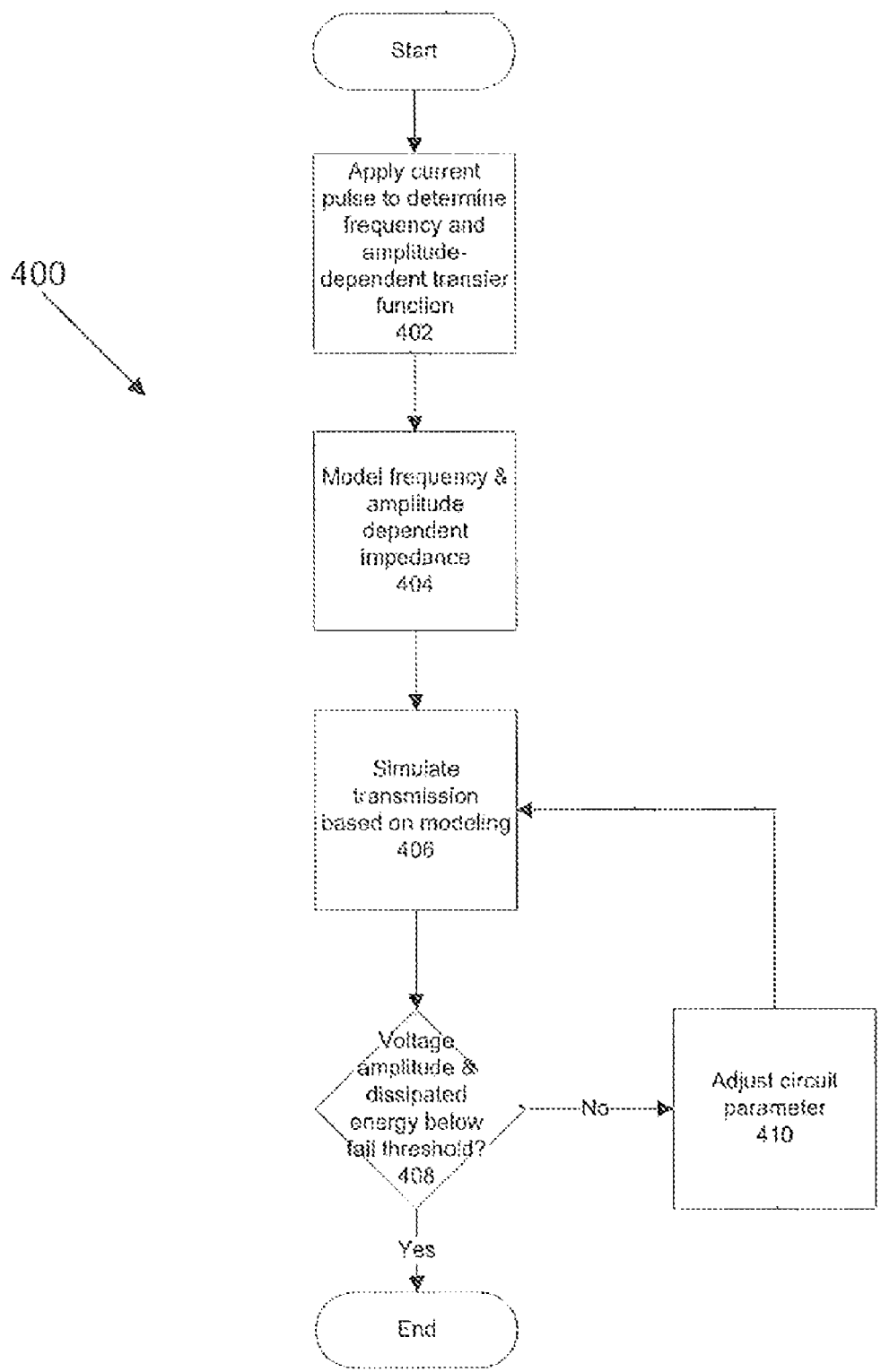
FIG. 4 is a flowchart of an exemplary process for ESD protection in accordance with one embodiment of the present disclosure.

Referring to FIG. 4, a flowchart of an exemplary process for ESD protection is depicted in accordance with one embodiment of the present disclosure. Process 400 begins at step 402 to apply at least one current pulse to determine at least one frequency-dependent and amplitude-dependent transfer function of the circuit. For example, application module 202 may apply a set of current pulses and determination module 204 may determine at least one frequency-dependent and amplitude-dependent transfer function based on the set of applied current pulses.

Next, process 400 continues to step 404 to model at least one frequency-dependent and current-dependent impedance of at least one nonlinear element of the circuit. For example, a modeling module 206 may model at least one frequency-dependent and current-dependent impedance of at least one nonlinear element of the circuit based on the transfer function. In one embodiment, the at least one frequency-dependent and current-dependent impedance may be calculated from a look up table of a fourier transform of the at least one frequency-dependent and amplitude-dependent transfer function. In an alternative embodiment, the at least one frequency-dependent and current-dependent impedance may be calculated from an analytical function derived from a result of a fourier transform of the at least one frequency-dependent and amplitude-dependent transfer function.

Process 400 then continues to step 406 to simulate a transmission of the circuit based on the model from step 404. For example, a simulation module 208 may simulate a transmission of the circuit by determining a voltage amplitude and dissipated energy of at least one element of the circuit at each of the increasing current levels and different circuit parameters applied by the application module 202.

Process 400 then continues to step 408 to determine if the voltage amplitude and dissipated energy of at least one element of the circuit is below the at least one fail threshold of voltage and at least one fail threshold of energy. For example, the comparison module 210 may compare an amplitude of each of a set of current dependent curves with a given voltage fail profile and determine the dissipated energy of at least one element of the circuit by an integration of a dissipated power over frequency of at least one element of the circuit.

If the voltage amplitude and dissipated energy is below the at least one fail threshold of voltage and at least one fail threshold of energy, process 400 continues to step 410 to adjust at least one parameter of the circuit 100 and returns to step 406 to re-simulate the transmission of the circuit. If the voltage amplitude and dissipated energy is above the at least one fail threshold of voltage and at least one fail threshold of energy, process 400 terminates.

In summary, the present disclosure provides a method and system for ESD protection. The present disclosure provides a board level simulation that characterizes frequency-dependent transmission of non-linear elements at high current pulses, extracts models of current-dependent and frequency-dependent transmission coefficients or as a subcircuit reproducing the current-dependent transfer functions. Then, a frequency-domain system level ESD board simulation is performed. The simulation includes applying pulses of a certain power spectrum, calculating transmission in the frequency domain of various linear and nonlinear elements of the circuit, and detecting an overload level by assessing the voltage and power spectrum at critical locations of the circuit.

In this way, the robustness of the circuit over a wide spectrum may be thoroughly examined and transient behavior of the ESD circuit may be realistically assessed and corrections of circuit parameters may be performed to optimize the design.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed:

1. A system for an ESD protection circuit comprising:
a circuit comprising at least one non-linear element;
an application module configured to apply a set of current pulses to the circuit;
a determination module configured to determine at least one frequency-dependent and amplitude-dependent transfer function of the circuit based on the set of applied current pulses;
a modeling module configured to model at least one frequency-dependent and current-dependent impedance of the at least one non-linear element; and
a simulation module to simulate a transmission to the circuit based on the model.

2. The system of claim 1, further comprising:
a comparison module configured to compare a voltage amplitude and a dissipated energy of at least one element of the circuit to at least one fail threshold of voltage and at least one fail threshold of energy.

3. The system of claim 2, further comprising:
a correction module configured to adjust at least one parameter of the circuit based on the comparing of the voltage amplitude and the dissipated energy with the at least one fail threshold of voltage and the at least one fail threshold of energy.

4. The system of claim 1, wherein the application module is configured to apply at least one current pulse with different current levels and a predetermined pulse length.

5. The system of claim 4, wherein the determination module is configured to:
derive the at least one frequency-dependent and amplitude-dependent transfer function as a fourier transform from the time-dependent incident and a transmitted waveform at each of the different current levels.

6. The system of claim 5 wherein the modeling module is configured to:
calculate at least one frequency-dependent and current-dependent impedance based on a lookup table of a result of the fourier transform.

7. The system of claim 5, wherein the modeling module is configured to:
derive an analytical function based on a result of the fourier transform; and
calculate at least one frequency-dependent and current-dependent impedance using the analytical function.

8. The system of claim 4, wherein the at least one current pulse is at least one transmission line pulse with a variable pulse length.

9. The system of claim 2, wherein the application module is configured to:
apply at least one current pulse with a plurality of increasing current levels and at least one circuit parameter.

10. The system of claim 9, wherein the simulation module is configured to:
determine the voltage amplitude and the dissipated energy of at least one element of the circuit at each of the plurality of increasing current levels.

11. The system of claim 2, wherein the at least one fail threshold of voltage comprises a plurality of voltage amplitudes within a frequency range.

12. The system of claim 2, wherein the at least one fail threshold of energy comprises a plurality of energy levels in a pulse duration regime in which the at least one fail threshold of energy is dependent on the length of the set of applied current pulses.

13. The system of claim 2, wherein the at least one fail threshold of energy comprises a plurality of energy levels in a quasi stationary regime in which the at least one fail threshold of energy is independent of the length of the set of applied current pulses.

14. The system of claim 2, wherein the voltage amplitude of at least one element of the circuit comprises a set of current dependent curves.

15. The system of claim 14, wherein the comparison module is configured to compare an amplitude of each of the set of current dependent curves with a given voltage fail profile.

16. The system of claim 15, wherein the given voltage fail profile is a product of the at least one fail threshold of voltage and a weighted power spectrum of one of the set of current pulses.

17. The system of claim 10, wherein the simulation module is configured to determine the dissipated energy of at least one element of the circuit based on an integration of a dissipated power over frequency of at least one element of the circuit.

18. The system of claim 17, wherein the simulation module is configured to determine the integration of a dissipated power of at least one element of the circuit based on an integration of a power spectrum of the at least one current pulse and a ratio of a transmitted current amplitude to an incident current amplitude.

19. A method for providing a ESD protection circuit comprising:
applying at least one current pulse to determine at least one frequency-dependent and amplitude-dependent transfer function of the circuit;
modeling at least one frequency-dependent and current dependent impedance of the at least one non-linear element of the circuit based on the at least one frequency-dependent and amplitude-dependent transfer function; and
simulating a transmission to the circuit based on model.

20. The method of claim 19, further comprising:
comparing a voltage amplitude and a dissipated energy of at least one element of the circuit to at least one fail threshold of voltage and at least one fail threshold of energy.

21. The method of claim 20, wherein applying at least one current pulse comprises applying at least one current pulse with different current levels and a predetermined pulse length.

22. The method of claim 21, wherein modeling at least one frequency-dependent and current-dependent impedance of the at least one non-linear element of the circuit comprises:
deriving the at least one frequency-dependent and amplitude-dependent transfer function as a fourier transform from a time dependent incident and a transmitted waveform at each of the different current levels; and
calculating at least one frequency-dependent and current-dependent impedance based on a lookup table of a result of the fourier transform.

23. The method of claim 20, wherein simulating a transmission to the circuit based on model comprises:
applying at least one current pulse with a plurality of increasing current levels and at least one circuit parameter; and
determining the voltage amplitude and the dissipated energy of at least one element of the circuit at each of the plurality of increasing current levels.

24. The method of claim 20, wherein comparing a voltage amplitude and a dissipated energy of at least one element of the circuit to at least one fail threshold of voltage and at least one fail threshold of energy comprises:
comparing an amplitude of each of a set of current dependent curves with a given voltage fail profile; and
determining the dissipated energy of at least one element of the circuit by determining an integration of a dissipated power over frequency of at least one element of the circuit.

25. The method of claim 24, wherein determining an integration of a dissipated power over frequency of at least one element of the circuit comprises:
determining an integration of a power spectrum of the at least one current pulse and a ratio of a transmitted current amplitude to an incident current amplitude.

26. The method of claim 24, wherein comparing an amplitude of each of the set of current dependent curves with a given voltage fail profile comprises:

determining a product of the at least one fail threshold of voltage and a weighted power spectrum of one of the set of applied current pulses.

27. The method of claim 20, further comprising:
adjusting at least one parameter of the circuit based on the comparing of the voltage amplitude and the dissipated energy with the at least one fail threshold of voltage and the at least one fail threshold of energy.

28. A computer program product embodied in a tangible medium comprising computer implemented instructions for:
determining at least one frequency-dependent and amplitude-dependent transfer function of the circuit;
modeling at least one frequency-dependent and current-dependent impedance of the at least one non-linear element of the circuit based on the at least one frequency-dependent and amplitude-dependent transfer function;
simulating a transmission to the circuit based on model; and
comparing a voltage amplitude and a dissipated energy of at least one element of the circuit to at least one fail threshold of voltage and at least one fail threshold of energy.

* * * * *